United States Patent
Young

(10) Patent No.: US 7,620,886 B1
(45) Date of Patent: Nov. 17, 2009

(54) METHOD AND APPARATUS FOR ORDERING OBJECTS IN AN ELECTRONIC DOCUMENT

(75) Inventor: Jeffrey Young, San Jose, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 689 days.

(21) Appl. No.: 11/069,269

(22) Filed: Mar. 1, 2005

(51) Int. Cl.
  *G06F 17/00* (2006.01)
(52) U.S. Cl. .................. 715/203; 715/201; 715/243
(58) Field of Classification Search .............. 715/200, 715/201, 203, 229, 243, 251, 253, 277
  See application file for complete search history.

(56) References Cited

U.S. PATENT DOCUMENTS

| | | | | |
|---|---|---|---|---|
| 5,283,864 | A * | 2/1994 | Knowlton | 715/776 |
| 5,371,847 | A | 12/1994 | Hargrove | |
| 5,625,763 | A | 4/1997 | Cirne | |
| 5,721,850 | A | 2/1998 | Farry et al. | |
| 5,737,555 | A * | 4/1998 | Gregg et al. | 715/856 |
| 5,860,074 | A * | 1/1999 | Rowe et al. | 715/235 |
| 5,862,379 | A | 1/1999 | Rubin et al. | |
| 6,918,090 | B2 * | 7/2005 | Hesmer et al. | 715/760 |
| 7,111,243 | B1 | 9/2006 | Ballard et al. | |
| 2003/0018629 | A1 * | 1/2003 | Namba | 707/3 |
| 2003/0137538 | A1 * | 7/2003 | Hesmer et al. | 345/760 |
| 2004/0088195 | A1 * | 5/2004 | Childress et al. | 705/4 |
| 2005/0071752 | A1 * | 3/2005 | Marlatt | 715/506 |
| 2005/0160065 | A1 * | 7/2005 | Seeman | 707/1 |

OTHER PUBLICATIONS

Nolan Hester, FileMaker Pro 5 for Windows and Macintosh: Visual QuickStart Guide, published Jan. 26, 2000 by Peachpit Press, pp. 1-9.*
Steve Schwartz, Visual QuickProject Guide: Creating a database in FileMaker Pro, published Jan. 27, 2005 by Peahpit Press, pp. 1-2.*
Windy Chisholm, et al. "Web Content Accessibility Guidelines 1.0," May 5, 1999, 30 pages.

* cited by examiner

*Primary Examiner*—Stephen S. Hong
*Assistant Examiner*—Gregory J Vaughn
(74) *Attorney, Agent, or Firm*—Robert C. Kowert; Meyertons, Hood, Kivlin, Kowert & Goetzel, P.C.

(57) ABSTRACT

A method and apparatus for ordering or reordering objects (e.g., data, content, input objects, controls) within an electronic document. In a set order mode of operation, an operator orders objects by selecting or clicking on them in their desired order. During the set order mode, the apparatus displays a first indicator reflecting the set order mode, and a current index value—the order or position at which the next selected object will be placed. A control mode of operation is activated by engaging a predetermined key or control (e.g., CTRL key). During control mode, the apparatus displays a second indicator showing that the control mode is active, and the index of a target object (an object identified by a cursor controlled by the operator). The operator can reset the current index to the index of the target object by clicking on the target object while control mode is active.

21 Claims, 6 Drawing Sheets

METHOD AND APPARATUS FOR ORDERING OBJECTS IN AN ELECTRONIC DOCUMENT

BACKGROUND

This invention relates to the field of computer systems. More particularly, a method and apparatus are provided for facilitating the ordering of objects within a form or document.

Forms and other types of documents manipulated by users (e.g., web forms, database templates) often contain fields, radio buttons, icons and/or other objects to be manipulated or viewed by the users. Those objects are typically presented in some predefined order or sequence. For example, a user may complete a sequence of input fields by supplying the corresponding input for a field and pressing the "Tab" key to navigate to the next field. Or, a sequence of news stories, headlines or other content may be presented in a particular order.

However, existing methods of ordering objects within a document are unsatisfactory. In particular, systems for authoring or designing forms, user interfaces and other documents are generally non-intuitive and provide insufficient information to the operator as the objects are ordered.

For example, in some existing systems objects are ordered by clicking on the objects in the desired sequence or order. However, there is typically no visual indication of the current index or ordinal position within the sequence (i.e., the index to be assigned to the next object that is clicked), thereby making it difficult for an operator to keep track of which or how many objects have been ordered. If the operator is interrupted while ordering the objects, or cannot remember the current index for some other reason, she may have to start all over again.

Some systems allow a current index of a sequence to be reset based on the index of an object that has already been ordered, perhaps in preparation for re-ordering the objects that followed the selected object in the sequence. In these systems, however, there may be no indication of what the current index would be reset to.

Even if an index value is displayed for the operator, there is no indication of whether that index is the current index to be assigned to the next object or an index of an already-ordered object to be used to reset the current index.

SUMMARY

In one embodiment of the invention, a method and apparatus are provided for ordering or reordering objects (e.g., data, content, input objects, controls) within an electronic document.

In a set order mode of operation, an operator orders objects by selecting or clicking on them in their desired order. During this mode of operation, the apparatus displays a first indicator reflecting the set order mode, and a current index value—the order or position at which the next selected object will be placed.

A control mode of operation is activated by engaging a predetermined key or control (e.g., CTRL key). During control mode, the apparatus displays a second indicator showing that the control mode is active, and the index of a target object (an object identified by a cursor controlled by the operator). The operator can reset the current index to the index of the target object by clicking on the target object while control mode is active.

Set order mode of operation may automatically resume when the predetermined control key is released or deactivated.

DETAILED DESCRIPTION

Figure 1A:
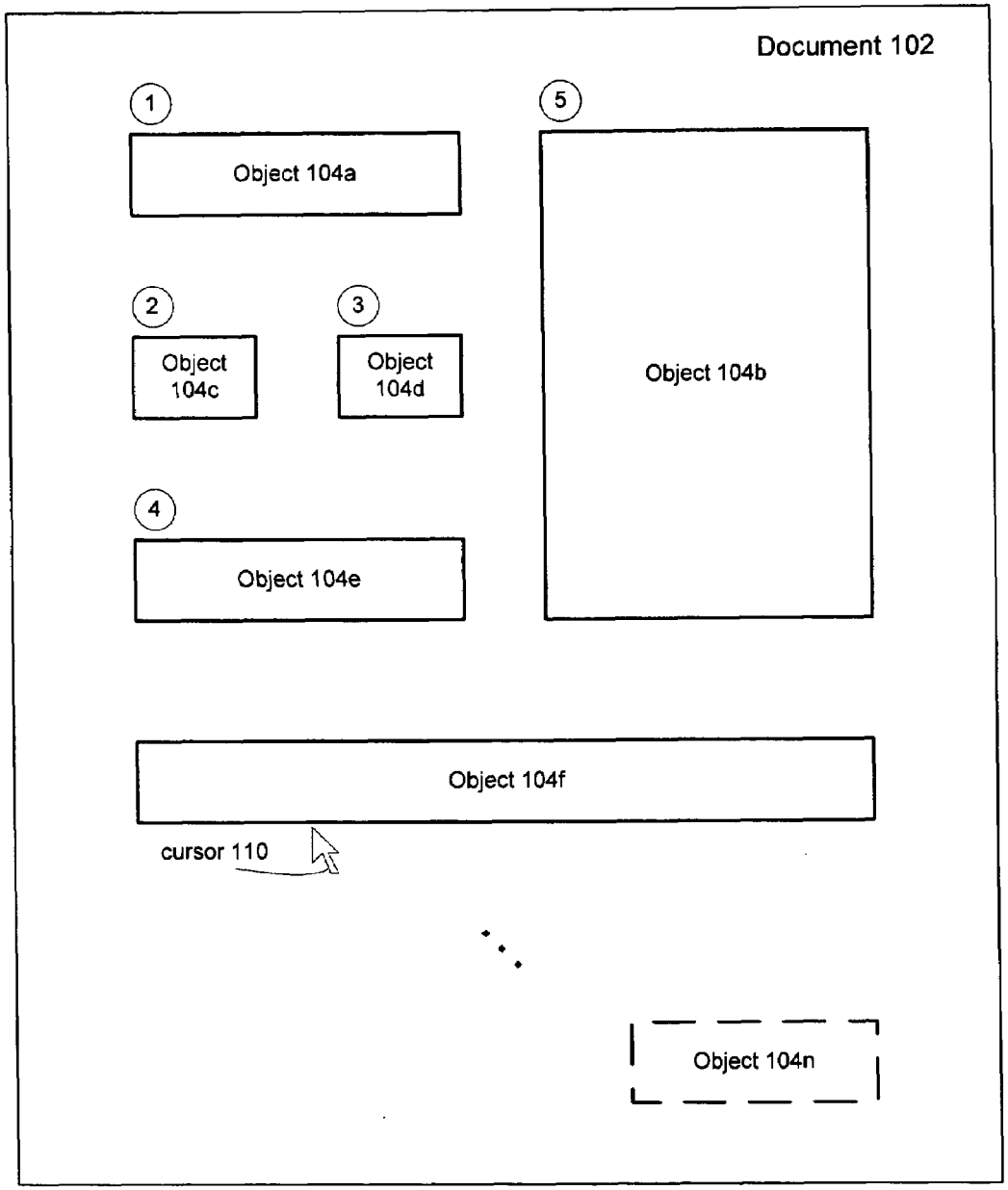
FIGS. 1A-B depict a prior art method of ordering objects, without visual indication of a current index or mode of operation.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an apparatus and method are provided for facilitating the ordering of objects within an electronic document (e.g., a web page, a form, a template, an application). Illustratively, the apparatus may comprise an automated tool or user interface for designing the document or for ordering the objects.

The objects may include data input fields, radio buttons, drop-down menus, images, hyperlinks or other types of electronic content. This embodiment of the invention may be implemented during the design or layout of the document, or at some time thereafter, thereby allowing an operator (e.g., a document designer or modifier) to set an initial order for the objects or to reorder them. As the objects are ordered or reordered, information facilitating the ordering is maintained and provided to the operator.

In one embodiment, the apparatus comprises a graphical user interface or a software tool or utility for ordering the objects, and has two modes of operation. In a first or "set order" mode, objects are ordered by selecting (e.g., clicking on) them in the desired order or sequence in which they are to be presented or displayed for a user. The apparatus may include a cursor or pointer icon for selecting an object.

In the set order mode of operation, the apparatus indicates (e.g., visually) the next index in sequence, which may be termed the "current index" herein. The apparatus also visually indicates that the identified index will be assigned to the next object that is selected.

For example, the apparatus may display the numerical value of the current index along with an appropriate icon or other graphical indicator, which may be termed a "set order mode indicator." This first indicator may comprise an arrow pointing in a particular direction (e.g., to the right, away from the cursor), or some other icon implying that the index will be assigned to the next object that is ordered.

Illustratively, when an object is ordered the current index is automatically incremented. In the presently described embodiment, the increment value is normally one. In other embodiments, the increment value may differ and may be negative.

In a second or "control" mode of operation, the current index is reset based on the index or ordinal position of a target object that has already been ordered. For example, when this mode is activated and a target object selected, the current index may be reset to the next index value after the index of the target object. In this mode, instead of displaying the current index (which is going to be reset), the apparatus visually identifies the index of the target object or, alternatively, the value to which the current index would be reset (i.e., the next index value after the index of the target object).

In the control mode, the apparatus also displays an indicator configured to show that the current index is being reset based on the target object's index. This second or "control" indicator may comprise an arrow pointing in a different direction than the set order mode indicator (e.g., to the left, toward the cursor), or some other icon indicating that the target object's index will be used to reset the current index.

In different embodiments of the invention, the current index may be initialized in different ways when an ordering or reordering operation is to be conducted. For example, the current index may be set to one or whatever the initial index value is. Or, if any objects are already ordered (e.g., from a previous ordering operation or by default), the current index may be initially set to the next index value after the highest index assigned to an object. In yet other objects, an initial current index may be specified by an operator or initialized in some other manner.

The apparatus may be switchable between the set order and control modes of operation by pressing a particular key combination, or through some other command issued by an operator.

For example, as described above, objects may be ordered (i.e., in the set order mode of operation) by clicking on them in a desired sequence. More particularly, an operator may order the objects by placing a cursor on or near an object and clicking a first (e.g., left) mouse or other input button or control. Until the first mouse button is clicked, the apparatus displays the set order mode indicator and the current index, which will be assigned to the selected object. After the first mouse button is clicked and the selected object is ordered, the current index is automatically incremented.

The control mode of operation may be activated by pressing a second input key or button (e.g., CTRL key, SHIFT key, right mouse button). This key or other input control may be termed the "control" key herein, even though it need not be the CTRL key of a keyboard. When the control key is pressed while the cursor is on or near a target object that has already been ordered, the apparatus displays the control mode indicator and the index assigned to the target object.

While the control key is activated, if the operator clicks the first (e.g., left mouse) input key, the current index is set or reset based on the index of the target object (e.g., the target object's index plus one). Operation may automatically return to the set order mode when the operator releases or deactivates the control key. If the target object has not already been ordered, selection of the target object during the control mode of operation may cause the current index to be reset to zero, one or some other initialization value, thereby allowing or requiring all objects to be ordered or reordered. This may also occur if the control mode is activated when the cursor is not near an object.

Figure 1B:
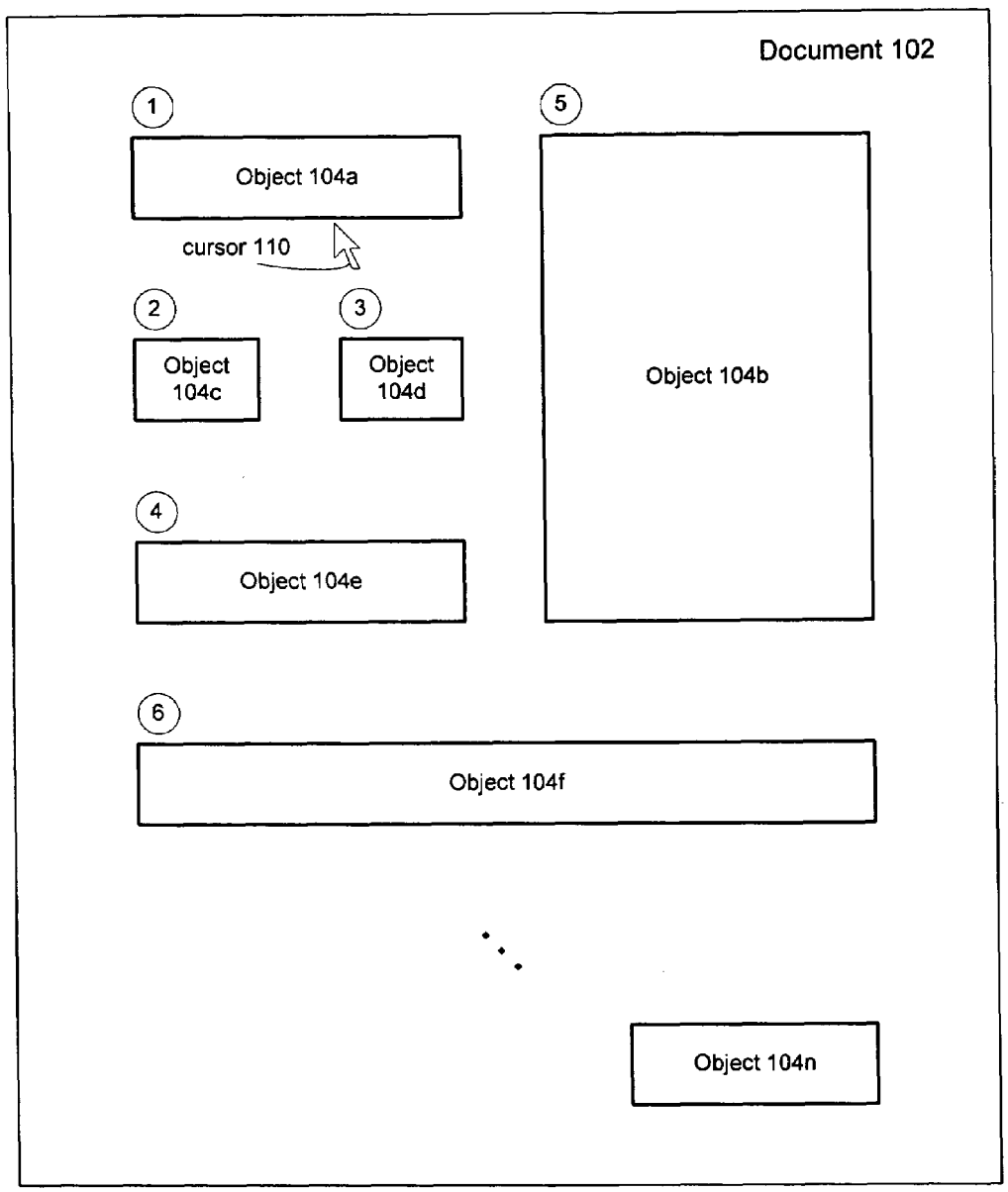

FIGS. 1A-1B demonstrate a prior art method of ordering objects. In FIG. 1A, document 102 comprises objects 104a-104n. Objects 104a, 104c, 104d, 104e and 104b have been ordered or indexed as indicated by the circled numerals appearing near the objects (i.e., 1-5 respectively). However, there is no indication of a current index. If an operator had just ordered the objects 1-5 as shown, he or she may know that the current index is six. Otherwise, he or she may have no idea of the current index and may need to reorder all the objects.

Illustratively, if document 102 was recently opened to reorder the objects, because there is no current index displayed, the operator would have to know that value. The initial current index may be one, to allow the operator to reorder all objects, but it may instead be some other value. For example, the initial current index may be set to six, with the assumption that the existing ordering is to be retained and the reordering will simply involve ordering the unordered objects. Again, if the operator were to click upon an object with cursor 110, he or she could not be certain of the index that will be assigned.

Or, assume FIG. 1A shows the status of document 102 after the operator has reordered some of the objects, such as objects 104a, 104c and 104d, with the other objects (e.g., objects 104b, 104e, 104f) having their previous or default indexes. In this case the current index would be four. There is no indication that the next object the operator clicks on will be assigned an index of four. If the operator is interrupted, when she resumes her task she may forget the current index and not remember what the current index is.

In summary, in the prior art method of FIG. 1A there is no indication of what order or index position object 104d (or any other object) would be placed in if the operator clicked on the object.

FIG. 1B depicts document 102 when an operator wishes to reorder the ordered objects to make object 104b the second object instead of the fifth. First the operator needs to reset the current index to two from its existing value, which may be unknown. The prior art method may allow the current index to be set based on the index assigned to an already ordered object. As shown in FIG. 1B, the operator would select object 104a and enter a specified command to reset the current index. However, there is no visual indication of what action is being taken. In addition, if the existing ordering is not shown, the operator would have no way of knowing what the current index is being reset to. Thus, even if the operator knows the process for resetting the current index, there is no indication of what is being done or what the new current index will be.

Figure 2A:
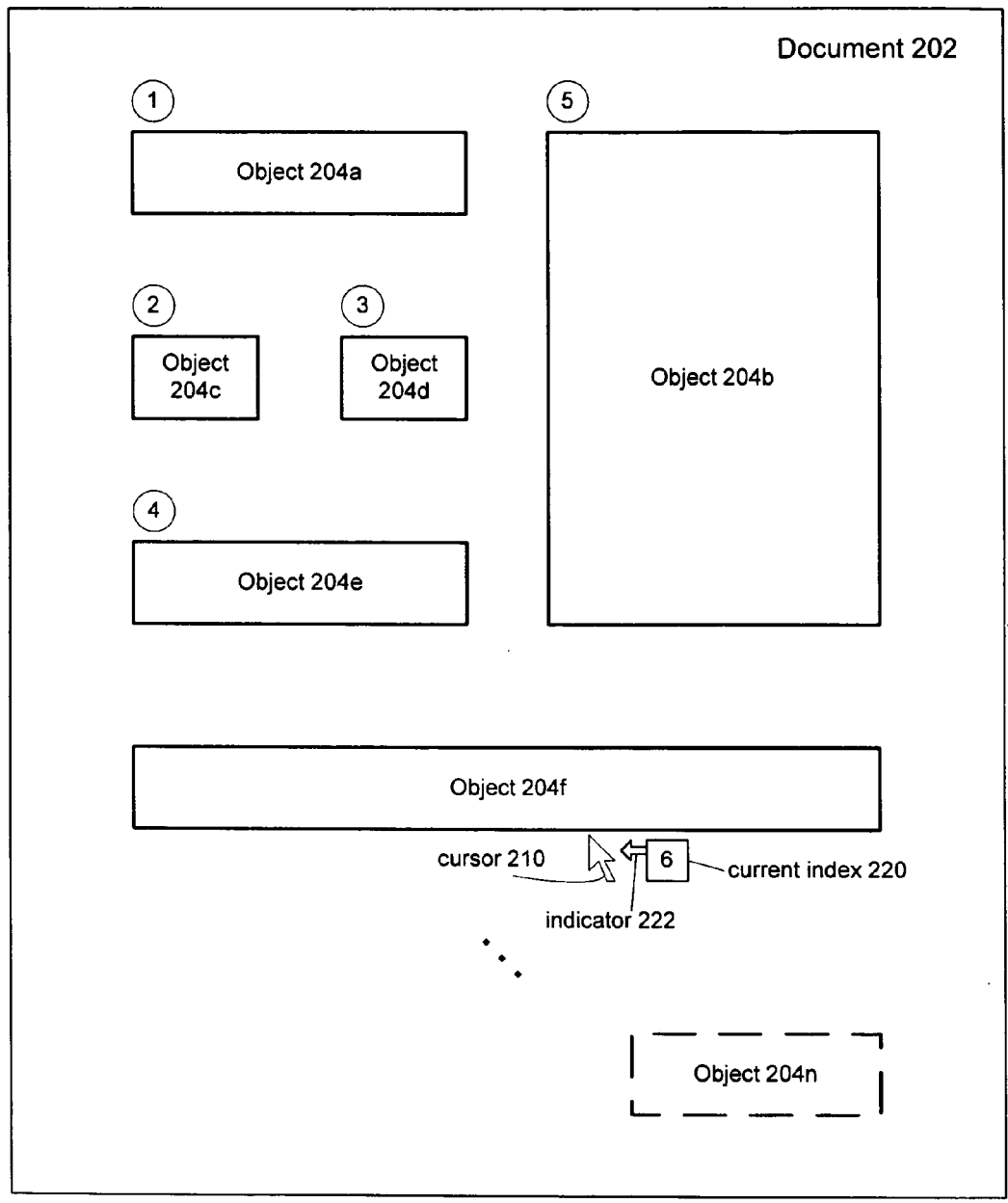
FIGS. 2A-C depict the ordering or reordering of objects in accordance with an embodiment of the invention.
Figure 2B:
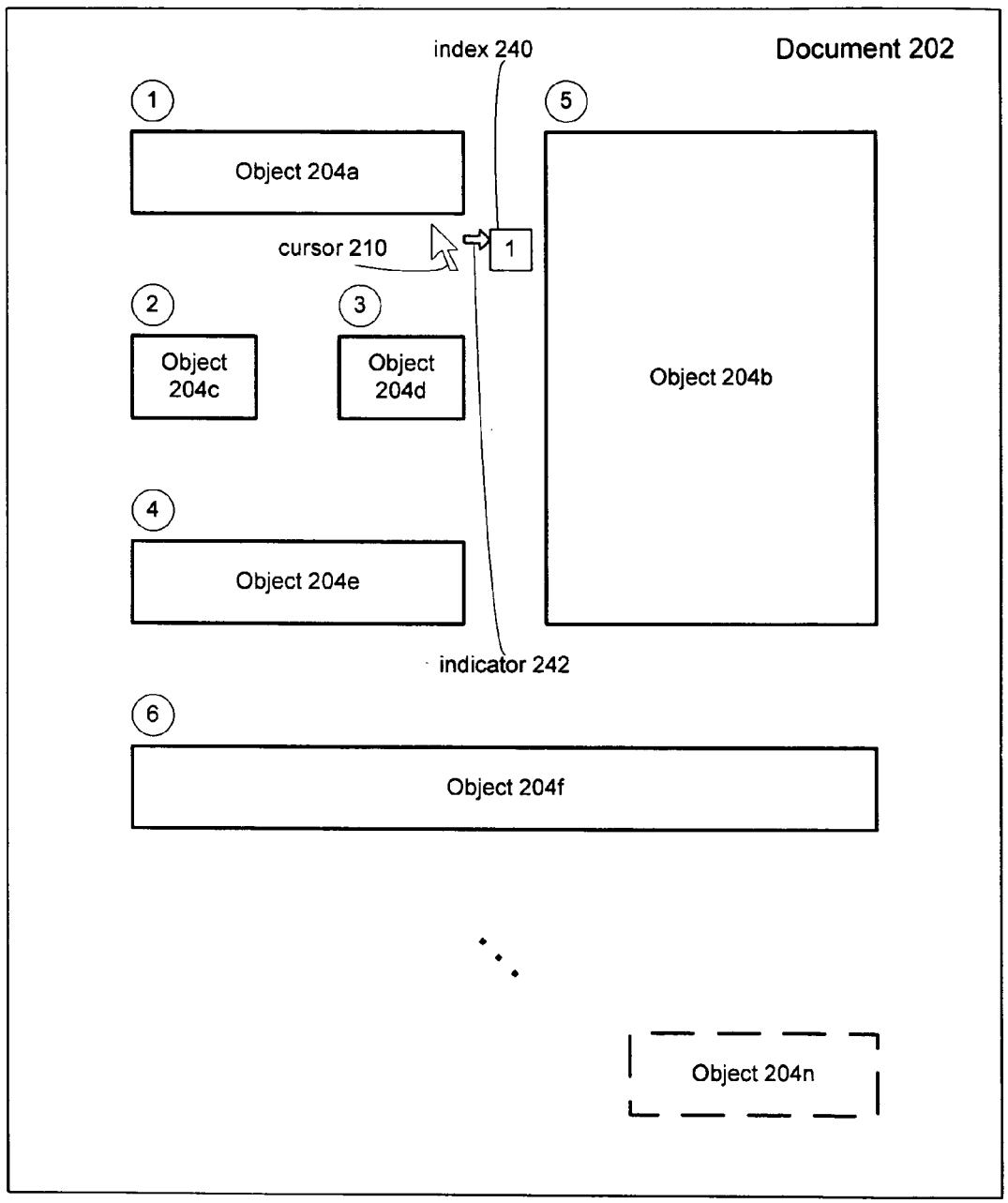
Figure 2C:
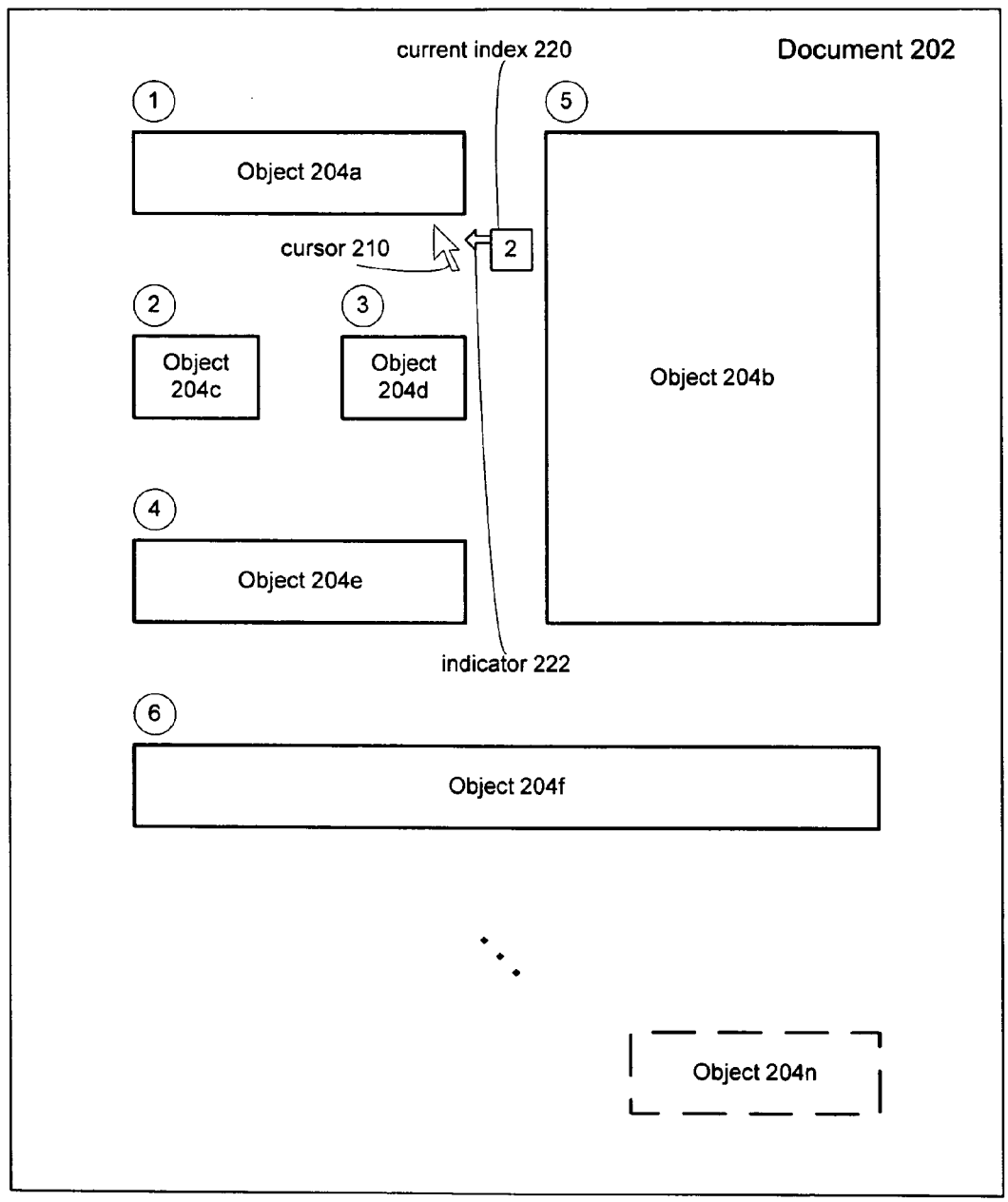

FIGS. 2A-2C demonstrate a method of facilitating the ordering or reordering of objects in an electronic document, according to one embodiment of the invention. In FIG. 2A, document 202 includes objects 204a-204n, with objects 204a-204e already ordered in the sequence indicated by the circled numerals. In FIG. 2A, the set order mode of operation is active.

In this embodiment of the invention, the current index is displayed during set order mode. In particular, current index 220 (i.e., six) is displayed near cursor 210. Set order mode indicator 222 is also displayed, and indicates that the displayed index will be assigned to the next object the operator selects or clicks on. Thus, if the operator clicks on object 204f, it will be ordered as the sixth object. Indicator 222 is configured to show that the displayed current index will be applied to the object selected by the cursor.

FIG. 2B shows document 202 when the operator wishes to reorder object 204b to be the second object. Doing so may cause objects 204c-204e to be automatically reordered as objects 3-5. The operator needs to reset the current index to two to accomplish the reordering.

Therefore, the operator has activated the control mode of operation by engaging the predefined control key (e.g., the CTRL key on a keyboard). This causes the index of the selected target object (object 204a) to be displayed as index 240. In addition, set order mode indicator 222 is replaced by control mode indicator 242. The operator can easily discern that clicking on the target object will cause the target object's index to be used to reset the current index.

In the control mode of operation, the operator may observe the assigned indexes of ordered objects by moving the cursor over or adjacent to those objects.

As shown in FIG. 2C, when the operator disengages the control mode of operation, index 240 is replaced by current index 220, which displays the value two as the new current index. And, set order mode indicator 222 replaces control mode indicator 242. The operator can then proceed to reorder object 204b by clicking on it.

In one alternative embodiment of the invention, information such as the current index, the index of a target object (for resetting the current index) the set order mode indicator and the control mode indicator may be displayed in a central location (e.g., in a toolbar or status bar, in a floating window) rather than near the cursor.

Figure 3:
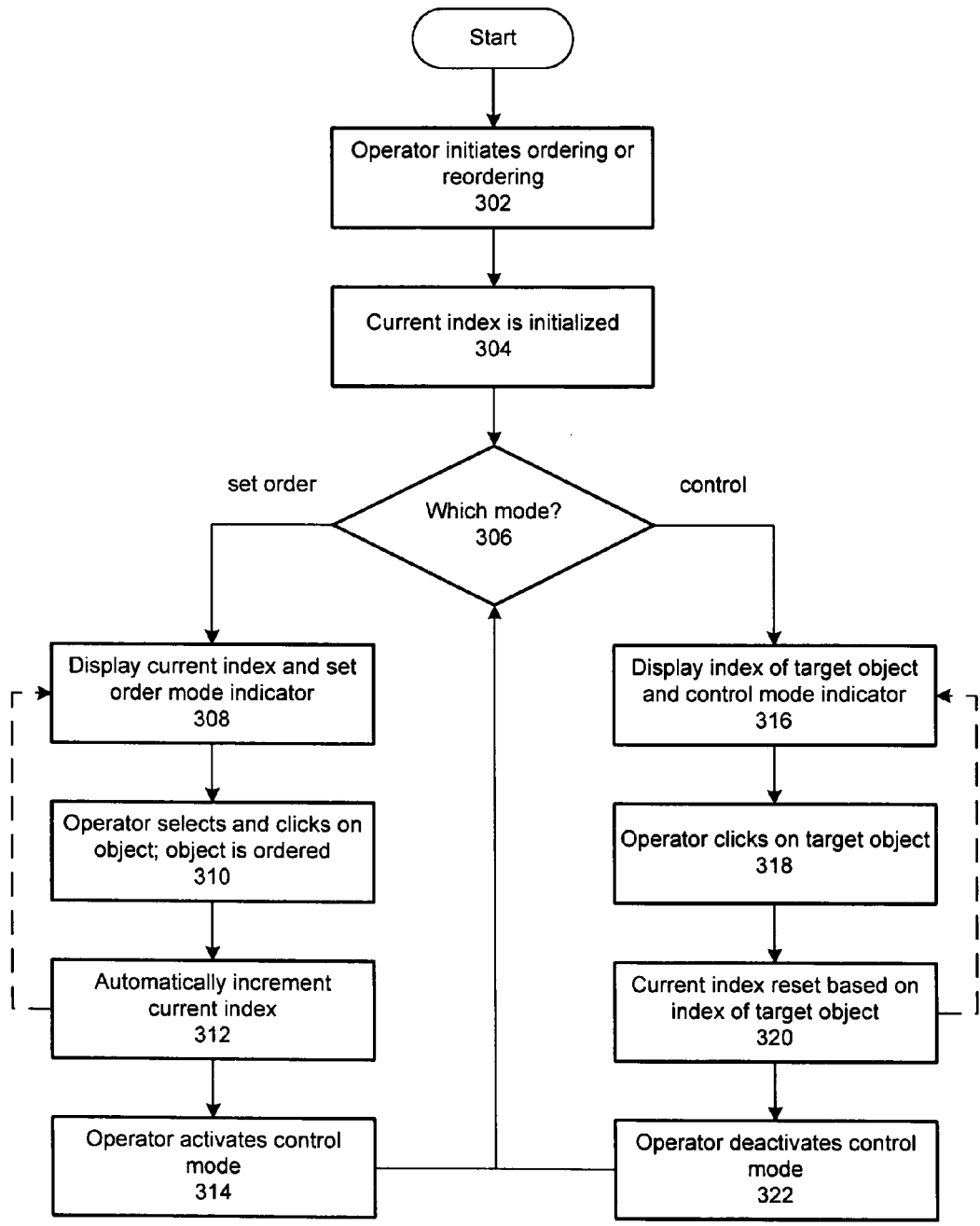
FIG. 3 is a flowchart illustrating one method of facilitating the ordering or reordering objects, in accordance with an embodiment of the invention.

FIG. 3 demonstrates a method of facilitating the ordering or reordering of objects within an electronic document, according to one embodiment of the invention. Other methods of facilitating the ordering or reordering may be derived from FIG. 3 and the following description, without exceeding the scope of the present invention.

In operation 302, an operator initiates the ordering or reordering by commencing the design of a new document or by opening an existing document to reorder objects within the document.

In operation 304, a "current index" value is initialized to the first index in a sequence (e.g., zero, one), to the next index after the highest one currently used, or to some other value.

In operation 306, either the set order or control mode of operation is initiated. Illustratively, an ordering or reordering exercise may begin in the set order mode, with the control mode of operation being activated when needed to reset the current index. If the set order mode is active, the method continues with operation 308. Otherwise, the method advances to operation 316.

In operation 308, in the set order mode of operation the apparatus displays the current index and a set order mode indicator as discussed above. The apparatus may also display a cursor for the operator to use to select an object.

In operation 310, the operator selects an object and clicks on it (e.g., with the left mouse button) or presses some other predetermined key or control. This causes the object to be ordered at the index position indicated by the current index.

In operation 312, the current index is automatically incremented (or decremented) by a default or operator-selected increment. In this embodiment, if the operator wishes to remain in the set order mode of operation, the method returns to operation 308.

Otherwise, if the operator needs to activate the control mode of operation in order to reset the current index, in operation 314 he or she activates control mode by depressing or activating the control key (e.g., the CTRL or SHIFT key, the right mouse button).

In operation 316, in the control mode of operation the apparatus displays the index of a target object, if the cursor is near a target object, and the control mode indicator, as described above. If the cursor is not near an object, the apparatus may display a default index (e.g., zero, one, the index of the last selected object).

In operation 318, the operator clicks on the target object while control mode is active.

In operation 320, the current index is reset based on the index of the target object. Thus, the current index may be set to a value that is one standard or default increment beyond the index of the target object (e.g., the target object's index plus one). In this embodiment, if the operator wishes to remain in the control mode of operation (e.g., he or she may have clicked on the wrong target object), the method returns to operation 316.

In operation 322, the operator deactivates the control mode of operation and the method returns to operation 306 or 308. Illustratively, control mode is automatically suspended (and set order mode resumed) when the operator releases or deactivates the control key.

The illustrated method may end at any time, such as when the operator has completed the ordering or reordering.

In one alternative embodiment of the invention, in the control mode of operation the apparatus resets the current index to the index of the target object, not the index next in sequence after the index of the target object.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method for facilitating the ordering of objects in an electronic document, the method comprising:

identifying within a document a plurality of objects to be ordered into a sequence;

tracking a dynamic current index to be assigned to the next object that is ordered;

displaying a first index;

displaying an indicator configured to indicate a current mode of a plurality of modes for said first index; and in response to input associated with one of the plurality of objects:

assigning said current index as that object's order in the sequence if the current mode is a first mode, wherein in said first mode said first index is displayed as said current index; or changing said current index to a previously assigned index of that object as previously ordered within the sequence if the current mode is a second mode, wherein in said second mode said first index is displayed as said previously assigned index.

2. The method of claim 1, further comprising, prior to said displaying a first index:
ordering said previously ordered object by:
receiving a selection of a first object within the plurality of objects;
receiving a first command;
ordering the first object within the sequence at said current index; and
automatically incrementing the current index;
wherein said previously ordered object is said first object.

3. The method of claim 2, wherein said first command comprises a selection from a pointing device.

4. The method of claim 1, further comprising, prior to said displaying a first index:
receiving a selection of said previously ordered object; and
receiving a second command.

5. The method of claim 4, further comprising, in response to said receiving a second command:
resetting said current index to the index of the previously ordered object.

6. The method of claim 4, wherein said second command comprises a CTRL key.

7. A computer-implemented method of ordering objects within a document, the method comprising:
identifying multiple objects orderable into a sequence;
maintaining a next rank identifying the sequence rank to be assigned to the object ordered next within the sequence;
in response to selection of a first object and receipt of a first command:
ordering the first object within the sequence at said next rank;
incrementing said next rank;
displaying said next rank; and
displaying a first indicator configured to indicate that said next rank is the rank to be assigned to the next ordered object; and
in response to a selection of a second object ordered within the sequence and receipt of a second command:
displaying the sequence rank of the second object in place of said next rank; and
displaying a second indicator configured to indicate that said displayed sequence rank is the rank within the sequence of the second object.

8. The method of claim 7, wherein:
said first command comprises a click with an input device; and
said second command comprises a control-click with the input device.

9. The method of claim 7, wherein:
the document is a form for receiving user input; and
the multiple objects comprise one or more input fields.

10. A computer readable memory medium storing instructions that, when executed by a computer, cause the computer to perform a method of ordering objects within a document, the method comprising:
identifying multiple objects orderable into a sequence;
maintaining a next rank identifying the sequence rank to be assigned to the object ordered next within the sequence;
in response to selection of a first object and receipt of a first command:
ordering the first object within the sequence at said next rank;
incrementing said next rank;
displaying said next rank; and
displaying a first indicator configured to indicate that said next rank is the rank to be assigned to the next ordered object; and
in response to a selection of a second object ordered within the sequence and receipt of a second command:
displaying the sequence rank of the second object in place of said next rank; and
displaying a second indicator configured to indicate that said displayed sequence rank is the rank within the sequence of the second object.

11. A computer-implemented method of facilitating the ordering of objects in an electronic document, the method comprising:
identifying within a document a set of objects to be ordered in a sequence;
displaying a next sequence index to be assigned to an object;
displaying an indicator configured to indicate that said next sequence index will automatically be assigned to the next object that is ordered; and
automatically updating said next sequence index each time an object is ordered.

12. The method of claim 11, further comprising:
receiving a selection of a first object;
receiving a first command; and
in response to the first command, ordering said first object in the sequence at said next sequence index.

13. The method of claim 11, further comprising:
for each of one or more ordered objects, displaying said ordered object's index within the sequence;
wherein said displayed next sequence index is distinct from said ordered objects' displayed indexes.

14. A computer-implemented method of facilitating the ordering of objects in an electronic document, the method comprising:
identifying within a document a set of objects to be ordered in a sequence;
maintaining a next sequence index to be assigned to the next object ordered in the sequence;
receiving a selection of an object that has previously been assigned an order in the set of objects;
receiving a first command; and
in response to the first command, displaying:
a first index of the selected object within the sequence, wherein the first index is the order previously assigned to the selected object; and
an indicator configured to indicate that said first index may be used to reset said next sequence index according to the previously assigned order of the selected object.

15. The method of claim 14, further comprising:
resetting said next sequence index to an index subsequent to said first index.

16. The method of claim 14, further comprising:
resetting said next sequence index to said first index.

17. The method of claim 14, further comprising, prior to said displaying:
displaying said next sequence index;
wherein said displaying said first index comprises displaying said first index in place of said next sequence index.

18. A system, comprising:
one or more processors;
a memory coupled to one or more processors, wherein the memory stores program instructions executable by the one or more processors to implement a graphical user interface for facilitating the ordering of objects within a document, the interface comprising:
multiple objects within a document, wherein the objects are orderable into a sequence; and a tool configured to facilitate ordering of the objects into the sequence by displaying, during said ordering:
   a first index within the sequence; and
   an indicator configured to indicate a mode of operation;
wherein said tool is switchable between:
   a first mode of operation in which said first index is a next index to be assigned to the next ordered object, wherein in said first mode of operation said tool is configured to order a selected one of the objects at said first index; and
   a second mode of operation in which said first index is an index of one of the objects that has already been ordered, wherein in said second mode of operation said tool is configured to change said next index based on said first index.

19. The system as recited in claim 18, wherein the graphical user interface further comprises a cursor configured to facilitate selection of an object.

20. The system as recited in claim 18, wherein: in said second mode of operation, said tool resets said next index to a second index subsequent to said first index.

21. The system as recited in claim 18, wherein: in said second mode of operation, said tool resets said next index to said first index.

* * * * *

UNITED STATES PATENT AND TRADEMARK OFFICE
CERTIFICATE OF CORRECTION

PATENT NO. : 7,620,886 B1  Page 1 of 1
APPLICATION NO. : 11/069269
DATED : November 17, 2009
INVENTOR(S) : Jeffrey Young It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this

Twenty-sixth Day of October, 2010

David J. Kappos
*Director of the United States Patent and Trademark Office*